United States Patent
Soma et al.

(10) Patent No.: US 12,097,981 B2
(45) Date of Patent: Sep. 24, 2024

(54) FLYING OBJECT AND FLYING OBJECT SYSTEM

(71) Applicant: MITSUBISHI HEAVY INDUSTRIES, LTD., Tokyo (JP)

(72) Inventors: Fumihito Soma, Tokyo (JP); Yuya Suganuma, Tokyo (JP); Nobutaka Ugomori, Tokyo (JP); Yasuhiro Fukushima, Tokyo (JP); Takeshi Miyabara, Tokyo (JP); Katsutoshi Maeda, Tokyo (JP); Naohisa Anabuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 772 days.

(21) Appl. No.: 17/259,737

(22) PCT Filed: Aug. 28, 2019

(86) PCT No.: PCT/JP2019/033730
§ 371 (c)(1),
(2) Date: Jan. 12, 2021

(87) PCT Pub. No.: WO2020/075407
PCT Pub. Date: Apr. 16, 2020

(65) Prior Publication Data
US 2021/0130000 A1   May 6, 2021

(30) Foreign Application Priority Data

Oct. 12, 2018 (JP) ................. 2018-193833

(51) Int. Cl.
*B64U 50/37* (2023.01)
*F03D 9/32* (2016.01)
(Continued)

(52) U.S. Cl.
CPC ............... *B64U 50/37* (2023.01); *F03D 9/32* (2016.05); *F03D 9/322* (2023.08); *B64U 10/13* (2023.01);
(Continued)

(58) Field of Classification Search
CPC .... B64U 50/37; B64U 2101/35; B64U 10/13; B64U 2101/55; B64U 50/19; F03D 9/32; F03D 9/322
See application file for complete search history.

(56) References Cited

U.S. PATENT DOCUMENTS

2016/0039300 A1* 2/2016 Wang ................ B64D 27/24
                                                          244/58
2016/0196756 A1* 7/2016 Prakash ............ G06Q 10/083
                                                            701/3
(Continued)

FOREIGN PATENT DOCUMENTS

EP   3 296 199     3/2018
JP   08-1981985    8/1996
(Continued)

OTHER PUBLICATIONS

Extended European Search Report issued Jul. 6, 2021 in corresponding European Patent Application No. 19870887.7.
(Continued)

*Primary Examiner* — Viet P Nguyen
(74) *Attorney, Agent, or Firm* — Wenderoth, Lind & Ponack, L.L.P.

(57) ABSTRACT

A flying object 20 is provided with a rotor blade 200 that generates lift and thrust by rotating and a rotating electrical
(Continued)

machine unit that rotates the rotor blade 200. The rotor blade 200 receive wind power and rotate when not flying. The rotating electrical machine unit generates electric power based on a power that rotates the rotor blades 200 when not flying. In addition, the flying object 20 may be provided with a power storage device 230 that stores electric power generated by the rotating electrical machine unit. In addition, the flying object 20 may be provided with a detachably connected cartridge 260 that has a desired function.

9 Claims, 13 Drawing Sheets

(51) Int. Cl.
*B64U 10/13* (2023.01)
*B64U 50/19* (2023.01)
*B64U 101/35* (2023.01)
*B64U 101/55* (2023.01)

(52) U.S. Cl.
CPC .......... *B64U 50/19* (2023.01); *B64U 2101/35* (2023.01); *B64U 2101/55* (2023.01)

(56) References Cited

U.S. PATENT DOCUMENTS

| | | | | |
|---|---|---|---|---|
| 2017/0225574 | A1* | 8/2017 | Thelen | B60L 53/12 |
| 2017/0284371 | A1* | 10/2017 | Gamble | B64C 27/50 |

FOREIGN PATENT DOCUMENTS

| | | |
|---|---|---|
| JP | 2005-082018 | 3/2005 |
| JP | 2007-078235 | 3/2007 |
| JP | 3182162 | 3/2013 |
| JP | 2016166767 | 9/2016 |
| JP | 2017-052389 | 3/2017 |
| JP | 2018-095236 | 6/2018 |
| WO | 2008/026290 | 3/2008 |
| WO | 2012/023202 | 2/2012 |

OTHER PUBLICATIONS

Translation of the International Preliminary Report on Patentability issued Apr. 22, 2021 in International Application No. PCT/JP2019/033730.

International Search Report issued Dec. 3, 2019 in International (PCT) Application No. PCT/JP2019/033730.

* cited by examiner

FLYING OBJECT AND FLYING OBJECT SYSTEM

The present application claims priority based on the Japanese Patent Application No. 2018-193833 filed on Oct. 12, 2018 and incorporates herein all disclosure thereof.

TECHNICAL FIELD

The present invention relates to a flying object and a flying object system.

BACKGROUND ART

In recent years, flying objects such as drones are used in various purposes.

Patent Literature 1 (Japanese Patent Publication No. 2007-78235) discloses a technology to aim to strengthen air defense system by mounting a missile on an unmanned aerial vehicle.

Patent Literature 2 (PCT International Publication No. 2012/023202) discloses a radio tower provided with a wind power generator and a communication device that operates with electric power generated thereby.

CITED LIST

Patent Literature

[Patent Literature 1] Japanese Patent Publication No. 2007-78235
[Patent Literature 2] PCT International Publication No. 2012/023202

SUMMARY OF INVENTION

Flying objects that obtain lift and thrust by rotating wings include a flying object that flies by converting electric power stored in an internal storage battery to rotational power. A flying object that flies by use of electric power of a storage battery needs to replace the storage battery or charge the storage battery.

In view of the above situation, an object is to provide a flying object that realizes a labor saving in maintenance. Other objectives can be understood from following disclosures and explanations of embodiments.

A flying object related to an embodiment that achieves the above purpose is provided with rotor blades that generate lift or thrust by rotating and a rotating electrical machine unit that rotates the rotor blades. The rotor blades receive wing power and rotate when not flying. The rotating electrical machine unit generates electric power based on a power that rotates the rotor blades when not flying.

A flying object system related to an embodiment that achieves the above purpose is provided with the above-mentioned flying object and a master unit. The master unit is detachably connectable with the flying object.

According to the above embodiment, a flying object with low maintenance frequency can be provided.

DESCRIPTION OF EMBODIMENTS

Embodiment

Figure 1:
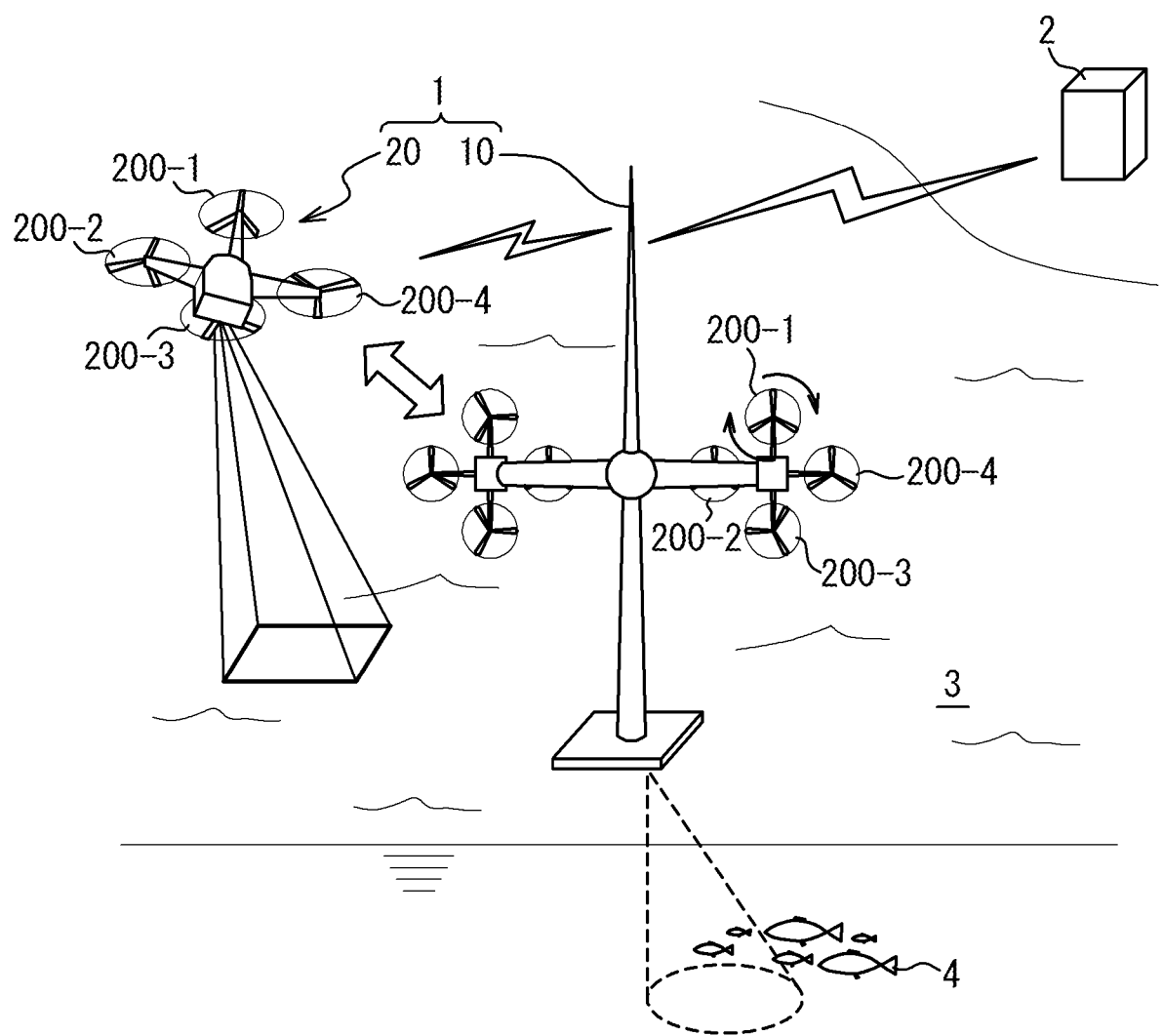
FIG. 1 is a schematic diagram of a flying object system according to an embodiment.

A flying object system 1 according to an embodiment is provided with a flying object 20 and a master unit 10, as shown in FIG. 1. The flying object 20 is provided with a plurality of rotor blades 200 (a first rotor blade 200-1, a second rotor blade 200-2, a third rotor blade 200-3, a fourth rotor blade 200-4). The flying object 20 can generate lift and fly by rotating the rotor blades 200. The flying object 20 flies by a remote control or an automatic operation, and for example includes a drone with a plurality of rotor blades, a quad-copter with four rotor blades, a multi-copter, and the like. The flying object 20 may include a helicopter having a rotor blade for obtaining lift. In addition, the flying object 20 may include a propeller plane using a rotor blade for obtaining thrust. Furthermore, the flying object 20 is exemplified by a manned air vehicle and an unmanned air vehicle. The flying object 20 flies in accordance with an instruction from an external device 2 and acquires information on surroundings such as in a sky, on a sea, on a ground and in a water. The flying object 20 transmits acquired information to the master unit 10. The flying object 20 may transmit acquired information to the external device 2. The flying object 20 may perform transmission and reception of information with the external device 2, directly. In addition, the flying object 20 may perform transmission and reception of information with the external device 2, via the master unit 10. The external device 2 may, for example, include land facilities, an aircraft, an artificial satellite, marine facilities and the like.

The flying object 20 is configured to be able to take off from and land on the master unit 10. In the present application, a landing includes a move of the flying object 20 to a predetermined position of the master unit 10. In addition, a taking off includes a flying of the flying object 20 from the master unit 10. The flying object 20 is configured to be fixed to the master unit 10 when landed to the master unit 10. The master unit 10 can rotate the flying object 20 so as to make a rotation axis direction of the rotor blade 200 of the flying object 20 and a wind direction be parallel. By doing so, the rotor blade 200 of the flying object 20 rotates by receiving a wind power. The flying object 20 can efficiently generate electric power as a wind power rotates the rotor blade 200. The flying object 20 stores generated electric power and rotates the rotor blade 200 by use of the generated electric power when flying.

As described above, the flying object system 1 uses the rotor blade 200 of the flying object 20 for lift and thrust when the flying object 20 is taken off from the master unit 10 and uses the rotor blade 200 of the flying object 20 for electric power generation when the flying object 20 is landed on the master unit 10. As a result, the flying object system 1 can make the flying object 20 fly without external supply of electric power. That is, the flying object 20 needs no maintenance time for battery charge to be provided and its maintenance frequency is low. For this reason, the flying object system 1 may be arranged in a sea 3 or the like. In this case, a user can, in an emergency, transmit an instruction to the flying object 20 from the external device 2 and make the flying object 20 move to a destination position. As a result, the user can instantly verify a state in surroundings of the flying object system 1 by use of the external device 2. For example, when a marine accident has occurred, the flying object 20 moves to a site of the accident and instantly transmits a state to the external device 2. By checking the state of the site, a rescue team can make necessary preparation and go to perform rescue operation.

In addition, the master unit 10 may acquire meteorologic information such as temperature, humidity, wind direction and wind power and transmit it to the external device 2. In addition, the master unit 10 may acquire oceanographic information such as sea water temperature, salinity, wave height, wave direction and wave period and transmit it to the external device 2. The master unit 10 may function as a base station for mobile phones, wireless communication and the like.

Figure 2:
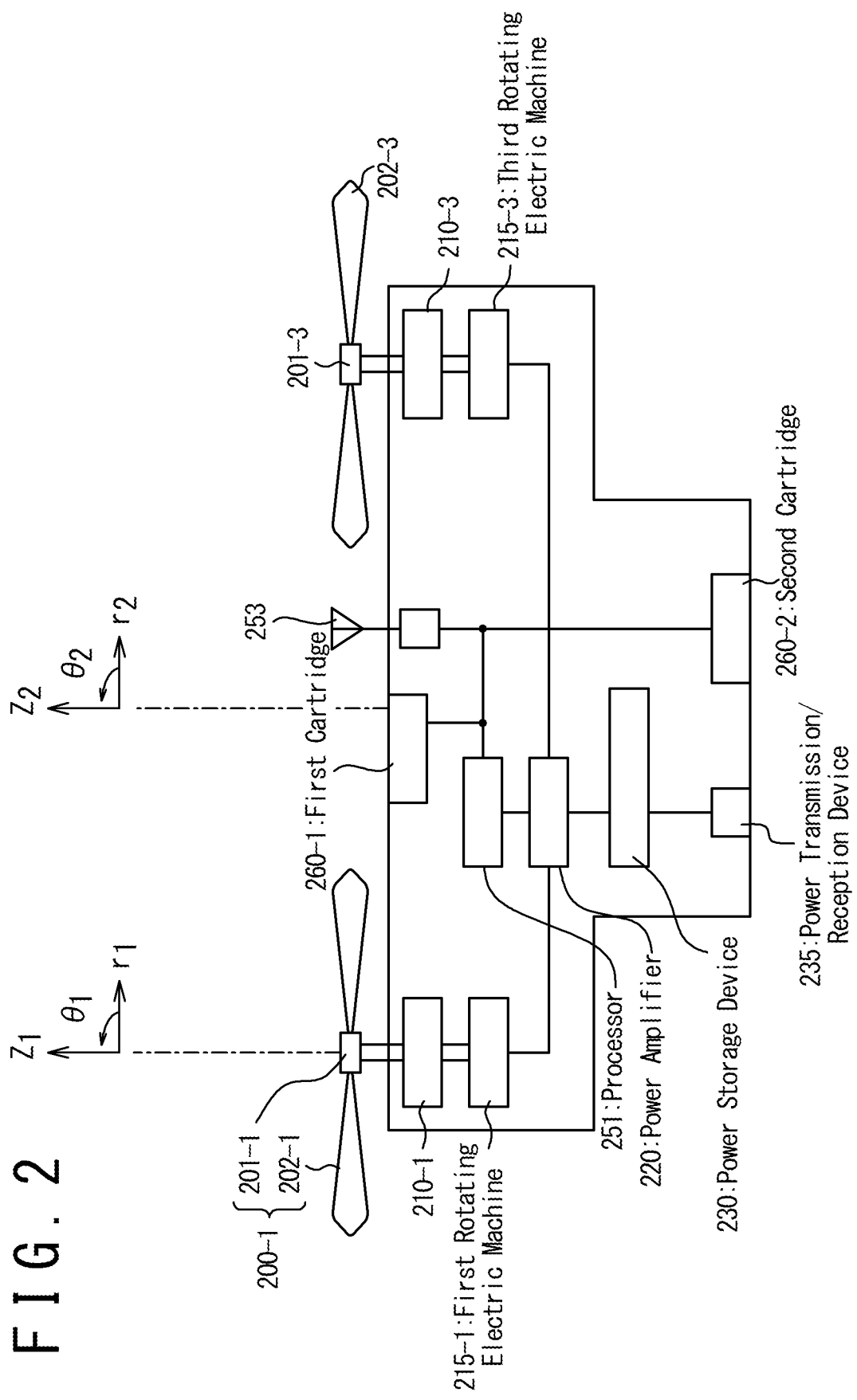
FIG. 2 is a schematic diagram of the flying object in FIG. 1.

As shown in FIG. 2, the flying object 20 is provided with the rotor blade 200, a rotating electric machine 215 that rotates the rotor blade 200, a power amplifier 220 that supplies power to the rotating electric machine 215, a power storage device 230 that stores electric power, a communication antenna 253 that performs communication with the master unit 10, and the like. For ease of understanding, it will be described by use of two cylindrical coordinate systems having cylindrical axes in a rotation axis direction of the rotor blade 200. In a first cylindrical coordinate system, a cylindrical axis is a first rotation axis 201-1 of a first rotor blade 200-1. A $z_1$ direction shows the cylindrical axis direction, an $r_1$ direction of a radius direction shows a direction perpendicular to the first rotation axis 201-1 and a $\theta_1$ direction of a circumferential direction shows a rotation direction of the first rotor blade 200-1. In a second cylindrical coordinate system, a $z_2$ direction in the cylindrical axis shows the $z_1$ direction that passes through a center of the flying object 20, an $r_2$ direction shows a radius direction and $\theta_2$ direction shows a circumferential direction.

Figure 3:
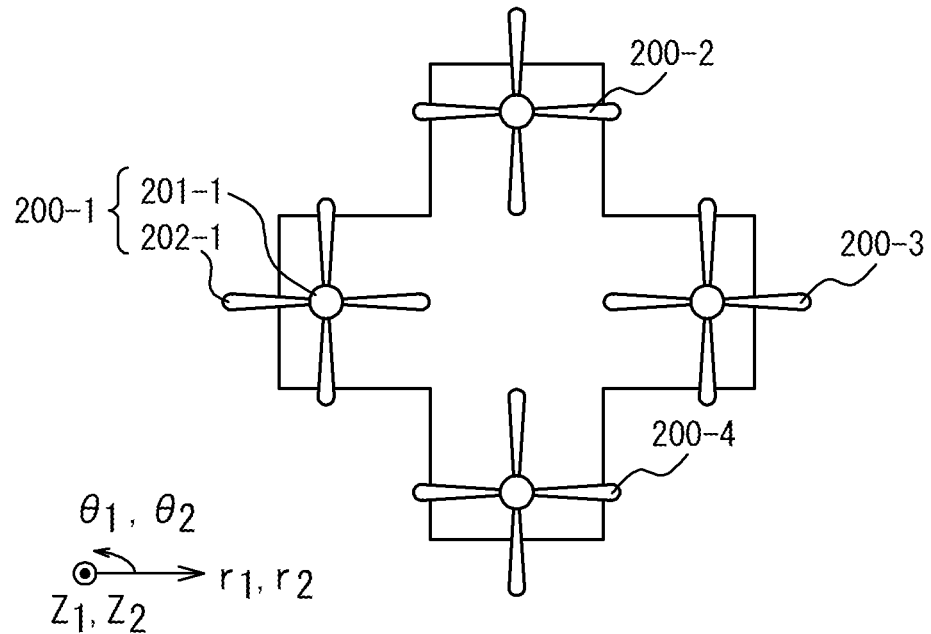
FIG. 3 is a schematic top view of the flying object in FIG. 1.

The first rotor blade 200-1 is provided with a first rotation axis 201-1 and a first group of blades 202-1. The first rotation axis 201-1 is formed in a column shape extended in the $z_1$ direction. The first group of blades 202-1 has a longitudinal direction in the $r_1$ direction and an end thereof is connected to a side surface of the first rotation axis 201-1. The first group of blades 202-1 has a plurality of blades. An interval of blades adjacent to each other in the $\theta_1$ direction can be arbitrarily selected. For example, as shown in FIG. 3, each blade may be connected to the first rotation axis 201-1 so that an interval in the $\theta_1$ direction of blades adjacent to each other is equal, respectively. In this case, if the first group of blades 202-1 has four blades, the interval in the $\theta_1$ direction of blades adjacent to each other may be 90 degrees. If the first group of blades 202-1 has three blades, the interval in the $\theta_1$ direction of blades adjacent to each other may be 120 degrees.

The first group of blades 202-1 generates lift by rotation of the first rotation axis 201-1. In addition, the first group of blades 202-1 generates a rotation power of rotating the first rotation axis 201-1 around the first rotation axis 201-1 by receiving a wind from the axis direction of the first rotation axis 201-1.

The second rotor blade 200-2 is provided with a second rotation axis 201-2 and a second group of blades 202-2 and has a configuration similar to the first rotor blade 200-1. The third rotor blade 200-3 also is provided with a third rotation axis 201-3 and a third group of blades 202-3 and has a configuration similar to the first rotor blade 200-1. The fourth rotor blade 200-4 also is provided with a fourth rotation axis 201-4 and a fourth group of blades 202-4 and has a configuration similar to the first rotor blade 200-1. An interval in the $\theta_2$ direction of rotation axes 201 of rotor blades 200 adjacent to each other can be arbitrarily selected. For example, each rotor blade 200 may be arranged so that an interval in the $\theta_2$ direction of rotation axes 201 of rotor blades 200 adjacent to each other is equal to each other. In addition, each rotation axis 201 may be arranged so that a distance in a $r_2$ radius direction from the center of the flying object 20 is equal.

A first gear device 210-1 is connected to the first rotation axis 201-1 and the first rotating electric machine 215-1. The first gear device 210-1 transmits the rotation power generated by the first rotating electric machine 215-1 to the first rotation axis 201-1. Similarly, the first gear device 210-1 transmits the rotation power that the first rotation axis 201-1 receives from a wind to the first rotating electric machine 215-1. That is, the first rotor blade 200-1 that has the first rotation axis 201-1 is connected to the first rotating electric machine 215-1 via the first gear device 210-1.

When the flying object 20 is fixed to the master unit 10, the first gear device 210-1 increases a rotation speed and transmits the rotation power of the first rotation axis 201-1 to the first rotating electric machine 215-1. As a result, even when the wind speed is small and the rotation speed of the first rotation axis 201-1 is slow, the first rotating electric machine 215-1 can generate sufficient electric power. In addition, when the flying object 20 is flying, the first gear device 210-1 decrease the rotation speed and transmits the rotation power generated by the first rotating electric machine 215-1 to the first rotation axis 201-1. As a result, the first rotating electric machine 215-1 can easily control the rotation speed of the first rotation axis 201-1. In addition, a rotation speed conversion rate of the first gear device 210-1 may be changed in accordance with a flying speed of the flying object 20. For example, when the flying object 20 flies with a high speed, the first gear device 210-1 may transmits the rotation power to the first rotation axis 201-1 with a same rotation speed. In addition, the first gear device 210-1 may increase the rotation speed and transmit the rotation power to the first rotation axis 201-1.

The first rotating electric machine 215-1 is connected to a power amplifier 220. When the flying object 20 flies, the first rotating electric machine 215-1 operates as an electric motor. For this reason, the first rotating electric machine 215-1 rotates the first rotor blade 200-1 via the first gear device 210-1 based on a signal from the power amplifier 220. In addition, when the flying object 20 is fixed to the master unit 10, the first rotating electric machine 215-1 operates as a generator. For this reason, the first rotating electric machine 215-1 converts the rotation power of the first rotor blade 200-1 generated by the wind power to the electric power. The converted electric power is supplied to the power amplifier 220.

The gear device 210 and the rotating electric machine 215 are respectively connected to each rotor blade 200. That is, the first rotor blade 200-1 is connected to the first rotating electric machine 215-1 via the first gear device 210-1. The second rotor blade 200-2 is connected to the second rotating electric machine 215-2 via the second gear device 210-2. The third rotor blade 200-3 is connected to the third rotating electric machine 215-3 via the third gear device 210-3. The fourth rotor blade 200-4 is connected to the fourth rotating electric machine 215-4 via the fourth gear device 210-4.

Figure 4:
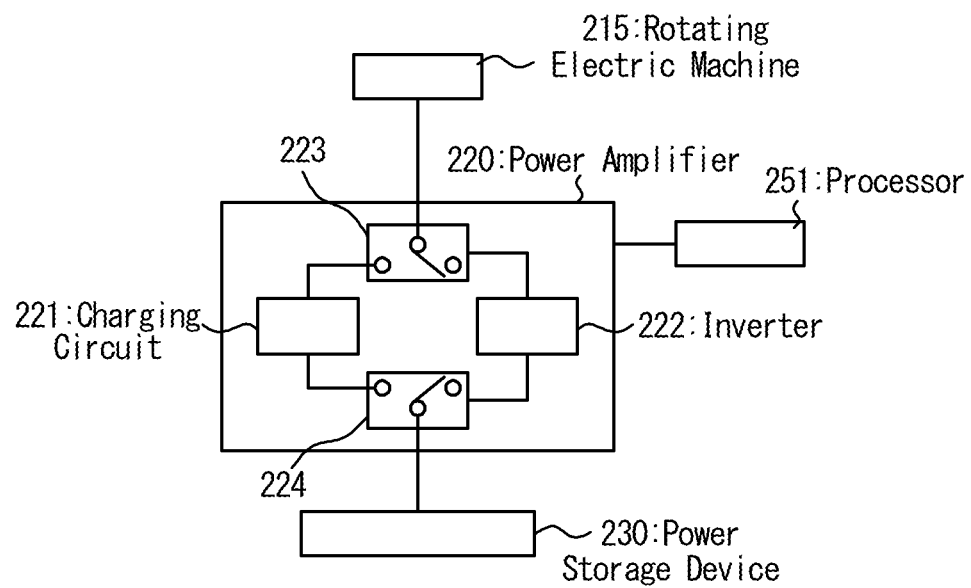
FIG. 4 is a diagram that shows a configuration of a power amplifier in FIG. 2.

The power amplifier 220 is connected to the rotating electric machine 215 and the power storage device 230. As shown in FIG. 4, the power amplifier 220 is provided with a charging circuit 221, an inverter 222, a first switch 223 and a second switch 224. When the flying objects 20 flies, the power amplifier 220 transmits an electric power supplied by the power storage device 230 to the rotating electric machine 215 via the inverter 222. That is, when the rotating electric machine 215 operates as a generator, the first switch 223 is set so that the rotating electric machine 215 and the inverter 222 are connected. In addition, the second switch 224 is set so that the power storage device 230 and the inverter 222 are connected.

In addition, when the flying object 20 is fixed to the master unit 10, the electric power generated by the rotating electric machine 215 is transmitted to the power storage device 230 via the charging circuit 221. That is, when the rotating electric machine 215 operates as a generator, the first switch 223 is set so that the rotating electric machine 215 and the charging circuit 221 are connected. In addition, the second switch 224 is set so that the power storage device 230 and the charging circuit 221 are connected.

In addition, the power amplifier 220 is connected to a processor 251. The first switch 223 and the second switch 224 are controlled based on a switching signal from the processor 251.

The inverter 222 converts the electric power supplied by the power storage device 230 to an alternative current with adjusted frequency and voltage and outputs it to the rotating electric machine 215. The rotation speed of the rotating electric machine 215 is controlled in accordance with the alternative current frequency. The inverter 222 adjusts outputting frequency and outputting voltage based on a rotation signal from the processor 251. In other words, the processor 251 controls the rotation speed of the rotating electric machine 215.

The charging circuit 221 is a circuit for charging the power storage device 230 with the electric power generated by the rotating electric machine 215. The charging circuit 221 monitors a voltage or the like of the power storage device 230 and controls charging to the power storage device 230.

The power storage device 230 supplies electric power to the power amplifier 220 and rotates the rotating electric machine 215. In addition, the power storage device 230 supplies electric power to each unit such as the processor 251 of the flying object 20. In addition, when the flying object 20 is fixed to the master unit 10, the power storage device 230 stores the electric power generated by the rotating electric machine 215.

Figure 5:
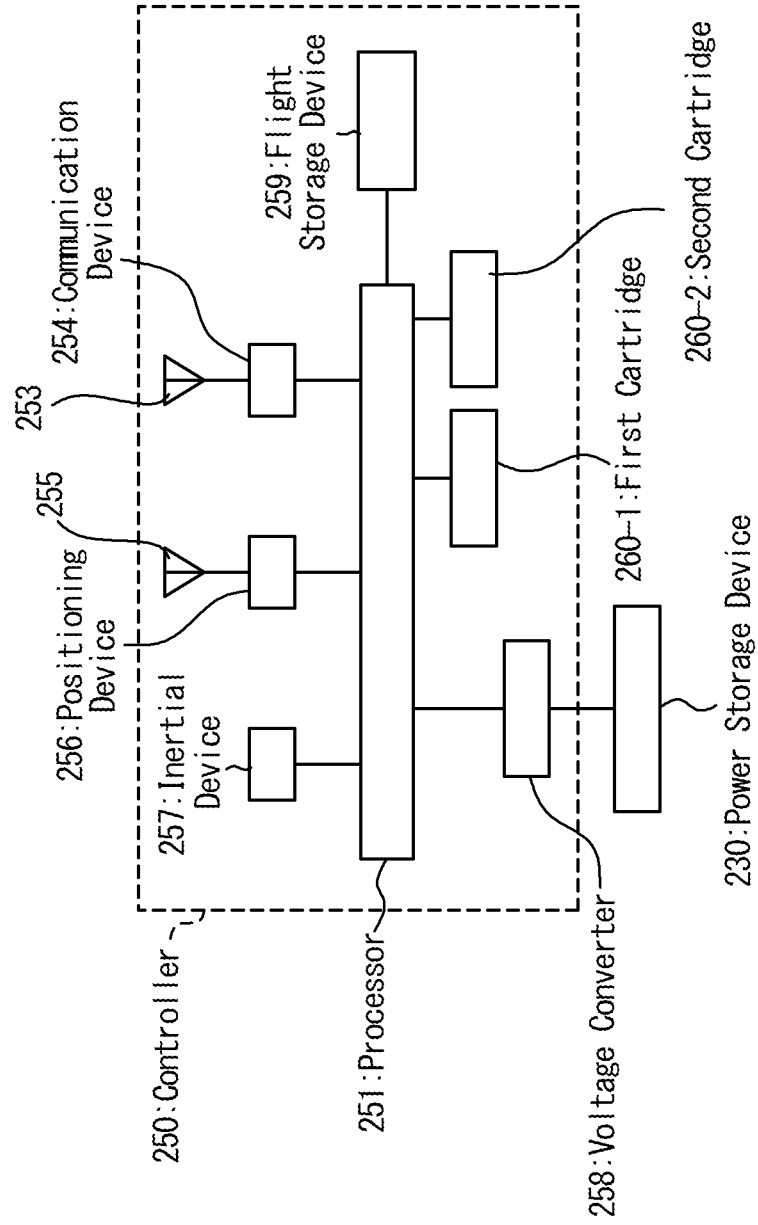
FIG. 5 is a diagram that shows a configuration related to a control of the flying object in FIG. 1.

A configuration related to a control of the rotating electric machine 215 and the like of the flying object 20 will be described. The controller 250 that includes the processor 251 controls the rotating electric machine 215 and the like of the flying object 20. As shown in FIG. 5, the controller 250 is provided with a communication device 254, a positioning device 256, an inertial device 257, a voltage converter 258, cartridges 260 (a first cartridge 260-1, a second cartridge 260-2) and the like. The voltage converter 258 converts the output voltage of the power storage device 230 to a voltage specified by the processor 251.

The communication device 254 performs transmission and reception of signals with an external device including the master unit 10 via the communication antenna 253. The communication device 254 is connected to the processor 251, extracts data from a received signal and outputs the data to the processor 251. In addition, the communication device 254 converts the data inputted from the processor 251 to a signal and transmits the signal to an external device via the communication antenna 253. The external device includes an arbitrary device that needs a communication such as the external device 2 and another flying object 20.

The positional device 256 receives a positional signal for measuring a position of an own device via a positional antenna 255. The positional device 256 calculates the position of the own device based on the positional signal and outputs the calculated position of the own device to the processor 251. For example, the positional signal includes signals of Global Positioning System (GPS) from artificial satellites.

The inertial device 257 measures an acceleration and an inclination of the own device and outputs them to the processor 251. The measured data are used for attitude control of the flying object 20.

The flight storage device 259 stores a flight program for controlling an attitude of the flying object 20. The processor 251 controls the attitude of the flying object 20 based on the flight program stored in the flight storage device 259.

Figure 6:
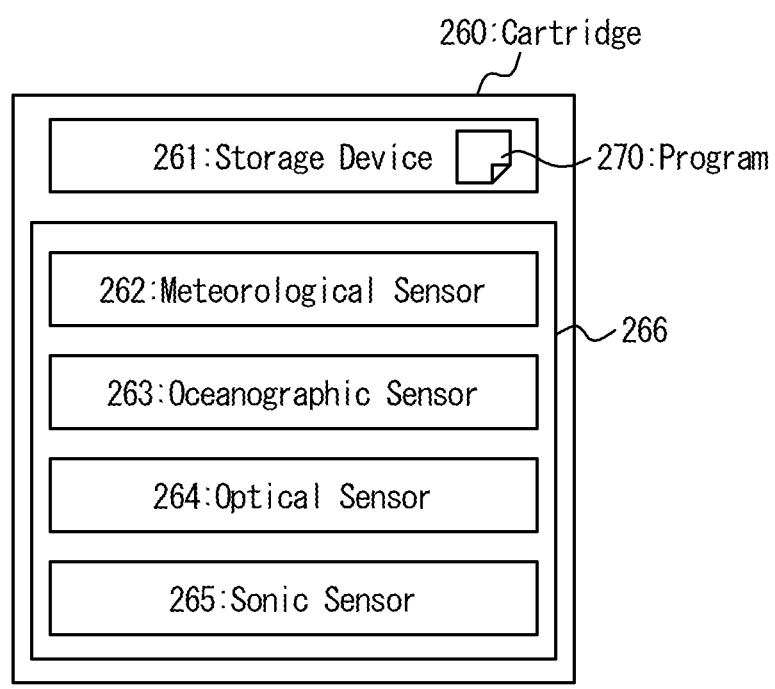
FIG. 6 is a diagram that shows a configuration of the cartridge in FIG. 2.

The first cartridge 260-1 and the second cartridge 260-2 are connected to the processor 251. Each cartridge 260 is provided with a program 270 in accordance with a role of the flying object 20 and various devices with desired functions. The program 270 indicates a content of a process in accordance with the role. For this reason, the processor 251 performs the process in accordance with the program 270 stored in the cartridge 260. In addition, the cartridge 260 acquires necessary information by use of the various devices and outputs it to the processor 251. As shown in FIG. 6, the cartridge 260 is provided with a storage device 261 and an expansion unit 266. The expansion unit 266 may be provided with various devices that realize arbitrary functions. The expansion unit 266 is provided with a meteorological sensor 262, an oceanographic sensor 263, an optical sensor 264 and a sonic sensor 265, for example. In addition, the expansion unit 266 may be provided with a radar, light, a communication device or the like.

The storage device 261 stores the program 270. In addition, the storage device 261 may store data necessary to processes of the processor 251.

The meteorological sensor 262 measures meteorologic information such as a temperature, a humidity, a wind direction and a wind power in the surroundings of the flying objects 20. The meteorological sensor 262 transmits measured meteorologic information to the processor 251.

The oceanographic sensor 263 measures oceanographic information, such as water temperature and wave height, of the sea in the surroundings of the flying object 20. The oceanographic sensor 263 transmits measured oceanographic information to the processor 251. The flying object 20 may lower the oceanographic sensor 263 in the sea and measure oceanographic information. The oceanographic sensor 263 may be removed from the flying object 20 and dropped in the sea. In this case, the oceanographic sensor 263 transmits acquired oceanographic information to the communication device 254 of the flying object 20. The oceanographic sensor 263 may transmit oceanographic information to a master unit communication device 144 of the master unit 10.

The optical sensor 264 takes a picture of the surroundings of the flying object 20. The optical sensor 264 transmits the taken picture to the processor 251. The optical sensor 264 includes a visible ray sensor, an infrared ray sensor, an ultraviolet ray sensor and the like.

The sonic sensor 265 acquires states in the sea or the like by use of ultrasonic waves or sonic waves. For example, the flying object 20 lowers the sonic sensor 265 in the sea and outputs ultrasonic waves or sonic waves. By detecting reflection waves of the outputted sonic waves, the sonic sensor 265 detects a shape of a seabed, a school of fishes 4 and the like. The sonic sensor 265 transmits detected information to the processor 251. In addition, the sonic sensor 265 may be removed from the flying object 20 and dropped in the sea.

The processor 251 reads out and executes the flight program stored in the flight storage device 259. By controlling each rotating electric machine 215, the processor 251 performs attitude control, flight direction control and flight speed control of the flying object 20, in accordance with the flight program.

In addition, the processor 251 may read out and execute the program 270 stored in the first cartridge 260-1 and the second cartridge 260-2. The processor 251 acquires necessary information from the meteorological sensor 262, the oceanographic sensor 263 or the like in the cartridge 260 and performs a process, in accordance with the program 270. For example, the processor 251 transmits information acquired by the meteorological sensor 262 and the oceanographic sensor 263 to the external device 2. In addition, the processor 251 transmits a movie taken by the optical sensor 264 to the external device 2. In addition, the processor 251 may transmit acquired information to the master unit 10.

The flying object 20 acquires meteorologic information, oceanographic information or the like and transmit them to the external device 2 or the like, in accordance with the program 270 stored in the cartridge 260. For example, the cartridge 260 may be mounted with an infrared ray camera or the like as the expansion unit 266 and monitor a ship, another flying object or the like. In addition, the cartridge 260 may be provided with an infrared ray camera, a searchlight, a floating ring, a communication device or the like as the expansion unit 266 and support marine rescue. In addition, the cartridge 260 may be mounted with a missile, a radar sensor or the like as the expansion unit 266.

In addition, the cartridge 260 is detachably connected to the flying object 20. For this reason, the cartridge 260 can be replaced in accordance with the role of the flying object 20. By replacing the cartridge 260, the process of the flying object 20 can be changed.

Figure 7:
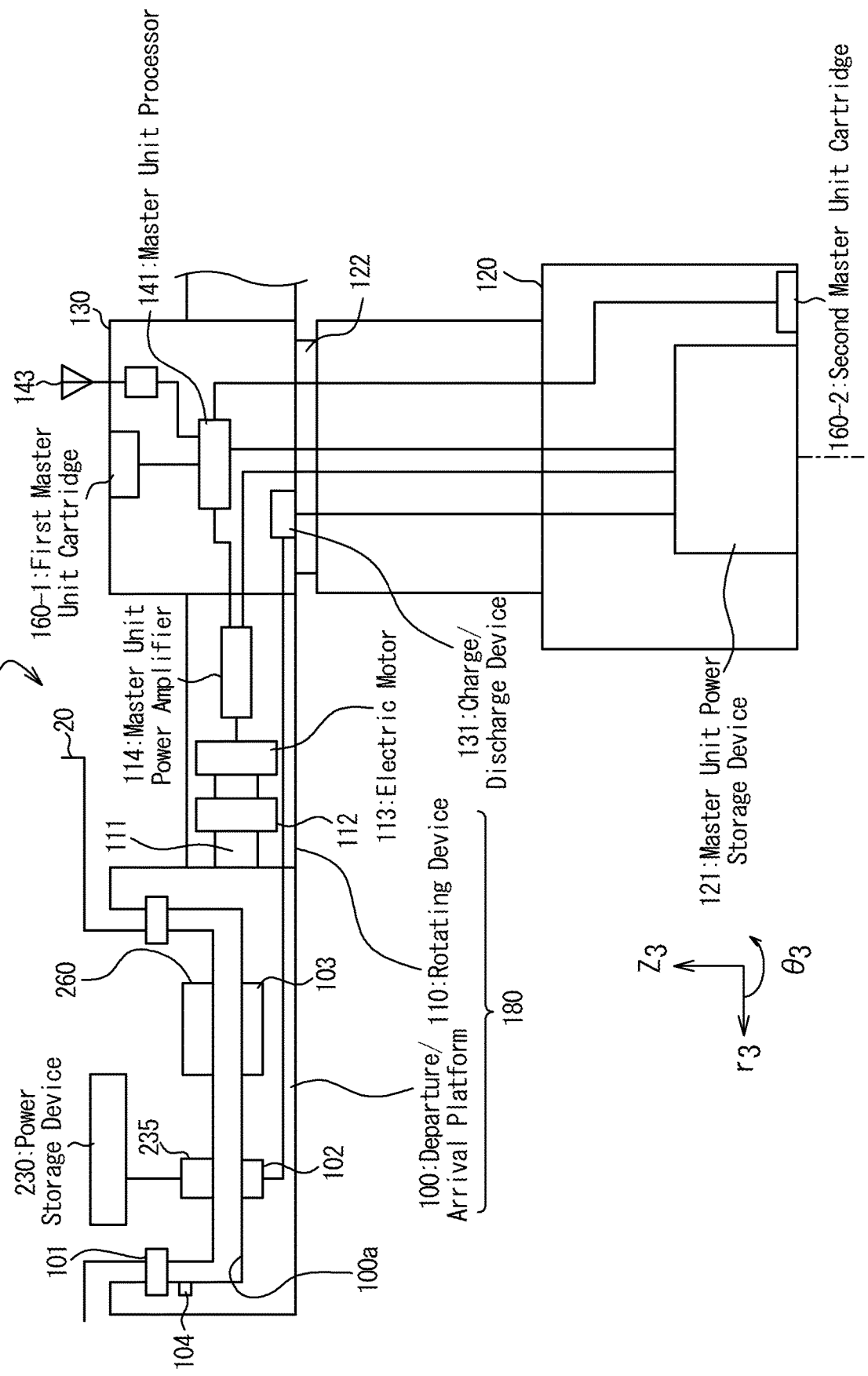
FIG. 7 is a schematic diagram of the master unit in FIG. 1.

As shown in FIG. 1, when the flying object 20 lands on the master unit 10, it is fixed and operates as a generator. As shown in FIG. 7, the master unit 10 is provided with a departure/arrival device 180 where the flying object 20 lands on and takes off, a master unit head part 130 and a master unit leg part 120. For ease of understanding, it will be described by use of a cylindrical coordinate system with a straight line in vertical direction passing through centers of the master unit leg part 120 and the master unit head part 130 as a cylindrical axis. In the cylindrical coordinate system, a $z_3$ direction shows a vertical direction, an $r_3$ direction shows a radius direction and a $\theta_3$ direction shows a circumferential direction. In addition, a $+z_3$ direction shows an upward direction and a $+r_3$ direction shows an outside radius direction.

The master unit head part 130 is connected to the master unit leg part 120 in the upward direction thereof, that is, in the $+z_3$ direction thereof, to be rotatable in the $\theta_3$ direction. The departure/arrival device 180 is connected to a side surface of the master unit head part 130, that is, in the $+r_3$ direction thereof. The departure/arrival device 180 is provided with a rotating device 110 formed in a column shape elongated in the $r_3$ direction and a departure/arrival platform 100 that fixes the flying object 20. An end of the rotating device 110 is connected to the master unit head part 130 and another end is rotatably connected to the departure/arrival platform 100.

A detail configuration of the master unit 10 will be described. A top part of the departure/arrival platform 100 is formed in a concave shape for example. On a bottom surface of the concave shape, a departure/arrival surface 100a with a normal perpendicular to the $r_3$ direction is formed. The flying object 20 lands on the departure/arrival platform 100. The flying object 20 controls the rotation axis direction of the rotor blade 200 in a direction it can lands on the departure/arrival platform 100 and lands on the departure/arrival platform 100. For example, the flying object 20 lands on the departure/arrival platform 100 so that the rotation axis direction of the rotor blade 200 is in a normal direction of the departure/arrival surface 100a, that is, in the $z_3$ direction.

In addition, the departure/arrival platform 100 is provided with a fixing device 101 that fixes the flying object 20. When detecting a landing of the flying object 20, the master unit 10 fixes the flying object 20 by use of the fixing device 101. As the flying object 20 is fixed to the master unit 10, it can generate electric power by use of the rotor blade 200. The master unit 10 detects the landing of the flying object 20 when the flying object 20 approaches the departure/arrival surface 100a from above to a position where it can be fixed by the fixing device 101. In addition, the master unit 10 may detect the landing of the flying object 20 when the flying object 20 contacts the departure/arrival surface 100a. In addition, when the flying objects takes off, the fixing device 101 releases the fixing of the flying object 20.

Furthermore, the departure/arrival platform 100 is provided with a cartridge replacing device 103 that replaces the cartridge 260 of the flying object 20. The cartridge replacing device 103 removes a cartridge 260 connected to the flying object 20 from the flying object 20 and installs a cartridge 260 in accordance with the role to the flying object 20, based on an instruction from the external device 2. In addition, the cartridge 260 of the flying object 20 may be replaced at the external device 2. In this case, the flying object 20 moves to the land facilities based on an instruction from the external device 2.

The rotating device 110 rotates the departure/arrival platform 100 around an axis in the $r_3$ direction. Herein, a normal direction of the departure/arrival surface 100a rotates in a surface perpendicular to the $r_3$ direction as it is perpendicular to the $r_3$ direction. For example, the rotating device 110 can rotate the normal direction of the departure/arrival surface 100a from the vertical direction to a horizontal direction. For example, when the flying object 20 is fixed to the departure/arrival platform 100, the rotation axis direction of the rotor blade 200 is in the normal direction of the departure/arrival surface 100a. For this reason, the rotating device 110 can rotate the rotation axis direction of the rotor blade 200 to a horizontal direction by rotating the departure/arrival platform 100. As described above, the rotating device 110 can rotate the departure/arrival platform 100 so that the rotation axis direction of the rotor blade 200 faces a direction in that the rotor blade 200 efficiently rotates by a wind power. The rotating device 110 is provided with a platform rotation axis 111, a master unit gear device 112, an electric motor 113 and a master unit power amplifier 114.

The end of the platform rotation axis 111 in the $+r_3$ direction is connected to a side surface of the departure/arrival platform 100 that is perpendicular to the departure/arrival surface 100a. As the platform rotation axis 111 rotates around an axis in the $r_3$ direction, the departure/arrival platform 100 rotates.

The electric motor 113 rotates the platform rotation axis 111 via the master unit gear device 112. A rotation power of the electric motor 113 is transmitted to the platform rotation axis 111 via the master unit gear device 112 that decreases its rotation speed.

The master unit power amplifier 114 supplies electric power to the electric motor 113 and controls an angle of which the departure/arrival platform 100 rotates. In particular, the master unit power amplifier 114 controls the electric motor 113 and change a direction of the normal direction of the departure/arrival surface 100a. When the flying object 20 takes off or lands on, the master unit power amplifier 114 changes the normal direction of the departure/arrival surface 100a to a vertical upward direction for example, so that the flying object 20 can land on the departure/arrival surface 100a. The flying object 20 can land on the master unit 10 by approaching from above the departure/arrival platform 100. In addition, when the flying object 20 generates electric power, the normal direction of the departure/arrival surface 100a is changed to a horizontal direction for example so that the rotor blade 200 can efficiently rotate by a wind power. As a result, the rotation axis direction of the rotor blade 200 is oriented to a horizontal direction and the flying object 20 can efficiently convert the wind power to electric power. The master unit power amplifier 114 controls the electric motor 113 based on a signal from the master unit processor 141.

Two rotating devices 110 are connected to side surfaces of the master unit head part 130 and the master unit head part 130 supports two rotating devices 110. For example, two rotating devices 110 are arranged to both sides of the master unit head part 130. In this case, an interval between two rotating devices 110 in the $\theta_3$ direction is 180 degrees. In addition, the master unit head part 130 is provided with a master unit processor 141, a master unit communication antenna 143, a first master unit cartridge 160-1 and a charge/discharge device 131.

The charge/discharge device 131 controls electric power transmission between the master unit power storage device 121 and the power storage device 230 of the flying object 20. When the power storage device 230 is sufficiently charged, the charge/discharge device 131 transmit electric power from the power storage device 230 to the master unit power storage device 121. In addition, when it is necessary to charge the power storage device 230, the charge/discharge device 131 transmits electric power from the master unit power storage device 121 to the power storage device 230.

Herein, in order to electrically connect the power storage device 230 and the master unit power storage device 121, the flying object 20 is provided with a power transmission/reception device 235 and the master unit 10 is provided with a master unit power transmission/reception device 102. The power transmission/reception device 235 and the master unit power transmission/reception device 102 perform electric power transmission without contact. In addition, the power transmission/reception device 235 and the master unit power transmission/reception device 102 may be provided with terminals and perform electric power transmission by contacting respective terminals.

Details of the master unit processor 141, the master unit communication antenna 143 and the first master unit cartridge 160-1 will be described later.

The master unit leg part 120 is provided with a swing device 122 at a top. The swing device 122 supports the master unit head part 130 and adjusts the rotation axis direction of the rotor blade 200 of the flying object 20. In particular, the swing device 122 rotates the master unit head part 130 in the $\theta_3$ direction. The swing device 122 turns the departure/arrival device 180 in the $\theta_3$ direction by rotating the master unit head part 130. For this reason, the swing device 122 turns the flying object 20 fixed to the departure/arrival device 180 in the $\theta_3$ direction. As a result, the rotation axis direction of the rotor blade 200 rotates in accordance with the turn of the flying object 20. As described above, the swing device 122 can control the rotation axis direction of the rotor blade 200. For example, the swing device 122 rotates the master unit head part 130 so that the longitudinal direction of the rotating device 110 is perpendicular to the wind direction. As a result, the flying object 20 that is fixed to the departure/arrival device 180 turns in the $\theta_3$ direction. In a case where the rotation axis direction of the rotor blade 200 is in a horizontal direction when the flying object 20 generates electric power, the rotation axis direction of the rotor blade 200 turns in the $\theta_3$ direction as the flying object 20 turns in the $\theta_3$ direction. In this way, the swing device 122 can rotate the rotation axis direction of the rotor blade 200 so as to be parallel to the wind direction.

The master unit leg part 120 is provided with the master unit power storage device 121. The master unit power storage device 121 supplies electric power to the master unit processor 141 and the like. In addition, the master unit power storage device 121 may supply electric power to external facilities.

In addition, the master unit leg part 120 is provided with a propulsion device. The master unit 10 can autonomously move based on an instruction from the external device 2. In addition, the master unit 10 may move based on an instruction from the flying object 20. For example, when the master unit 10 is arranged on the sea 3, the master unit 10 is floating on the water and is provided with a propulsion device such as a screw. When the master unit 10 runs on a land, the propulsion device includes wheels that runs on a road or rails. In addition, when the master unit 10 flies, the propulsion device includes a jet engine or the like.

Figure 8:
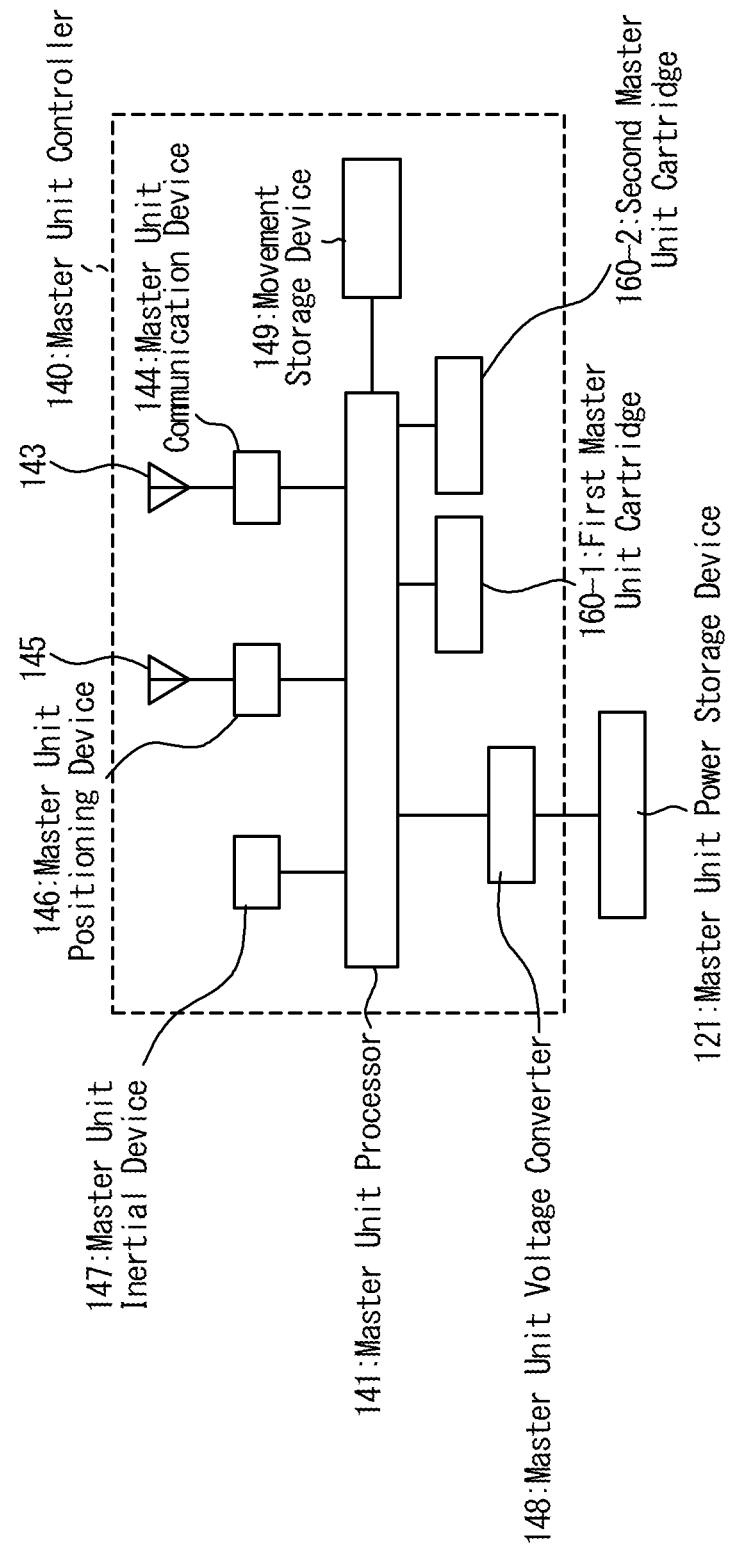
FIG. 8 is a diagram that shows a configuration related to a control of the master unit in FIG. 1.

A configuration related to a control of rotation angle of the electric motor 113 of the master unit 10, fixing the flying object 20 by the fixing device 101 and the like will be described. As shown in FIG. 8, the master unit controller 140 including the master unit processor 141 controls the electric motor 113 and the like of the master unit 10. The master unit controller 140 is provided with a master unit communication device 144, a master unit positioning device 146, a master unit inertial device 147, a master unit voltage converter 148, master unit cartridges 160 (a first master unit cartridge 160-1, a second master unit cartridge 160-2) and the like. The master unit voltage converter 148 converts an output voltage of the master unit power storage device 121 to a voltage specified by the master unit processor 141.

The master unit communication device 144 performs transmission and reception of a signal with an external device such as the flying object 20, the external device 2 and another master unit 10 via the master unit communication antenna 143. The master unit communication device 144 is connected to the master unit processor 141, extracts data from a received signal to output to the master unit processor 141. In addition, the master unit communication device 144 converts data inputted from the master unit processor 141 to a signal to transmit to an external device via the master unit communication antenna 143. An external device includes an arbitrary device that needs communication.

The master unit positioning device 146 receives positioning signals for measuring a position of the own device via the master unit positioning antenna 145. The master unit positioning device 146 calculates a position of the own device based on the positioning signals and outputs the calculated position of the own device to the master unit processor 141.

The master unit inertial device 147 measures an acceleration and an inclination of the own device to output to the master unit processor 141. The master unit inertial device 147 measures the inclination of the own device based on measured data and information calculated by the master unit positioning device 146.

The movement storage device 149 stores a movement program that controls a move of the master unit 10. The master unit processor 141 controls an attitude or the like of the master unit 10 based on the movement program stored in the movement storage device 149.

Figure 9:
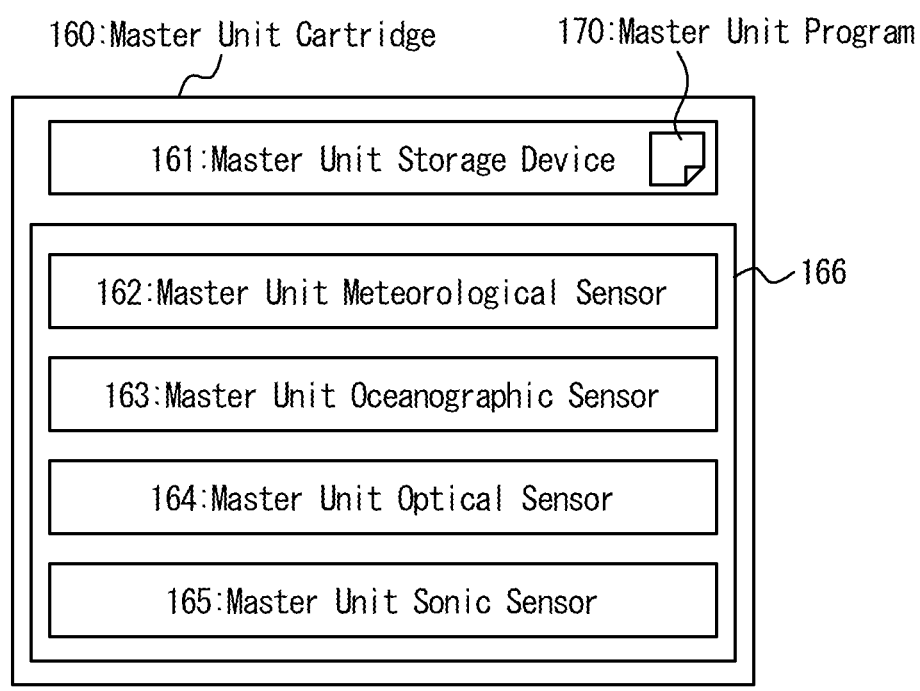
FIG. 9 is a diagram that shows a configuration of the master unit cartridge in FIG. 7.

The first master unit cartridge 160-1 and the second master unit cartridge 160-2 are connected to the master unit processor 141. Each master unit cartridge 160 is provided with a master unit program 170 in accordance with a role of the master unit 10 and various devices. The master unit program 170 indicates a process of the own device. For this reason, the master unit processor 141 performs a process in accordance with the master unit program 170 stored in the master unit cartridge 160. In addition, the master unit cartridge 160 acquires necessary information by use of various devices to output to the master unit processor 141. As shown in FIG. 9, the master unit cartridge 160 is provided with a master unit storage device 161 and a master unit expansion unit 166. The master unit expansion unit 166 can be provided with various devices that realize an arbitrary function, similarly to the expansion unit 266. The master unit expansion unit 166 is provided with a master unit meteorological sensor 162, a master unit oceanographic sensor 163, a master unit optical sensor 164 and a master unit sonic sensor 165 for example. The master unit meteorological sensor 162 functions similarly to the meteorological sensor 262. In addition, the master unit oceanographic sensor 163 functions similarly to the oceanographic sensor 263 and the master unit optical sensor 164 functions similarly to the optical sensor 264. In addition, the master unit expansion unit 166 may be provided with a radar, light, a communication device and the like.

The master unit sonic sensor 165 is arranged so as to contact sea surface. For this reason, the master unit sonic sensor 165 acquires states in the sea or the like by ultrasonic waves or sonic waves.

The master unit processor 141 performs controls of various devices of the master unit 10 such as a control of the electric motor 113 and a control of the charge/discharge device 131. In addition, the master unit processor 141 reads out and executes master unit programs 170 stored in the first master unit cartridge 160-1 and the second master unit cartridge 160-2. As a result, the master unit processor 141 acquires necessary information from the master unit meteorological sensor 162, the master unit oceanographic sensor 163 or the like of the master unit cartridge 160 and performs processes. For example, the master unit processor 141 transmits information acquired by the master unit meteorological sensor 162 and the master unit oceanographic sensor 163 to the external device 2. In addition, the master unit processor 141 transmits a movie taken by the master unit optical sensor 164 to the external device 2.

In addition, the master unit cartridge 160 is detachably connected to the master unit 10. For this reason, the master unit cartridge 160 can be replaced in accordance with the role of the master unit 10. For example, as shown in FIG. 1, the master unit 10 may detect a school of fish 4 and transmit a result thereof to the external device 2.

(Process when the Flying Object Lands on)

Figure 10:
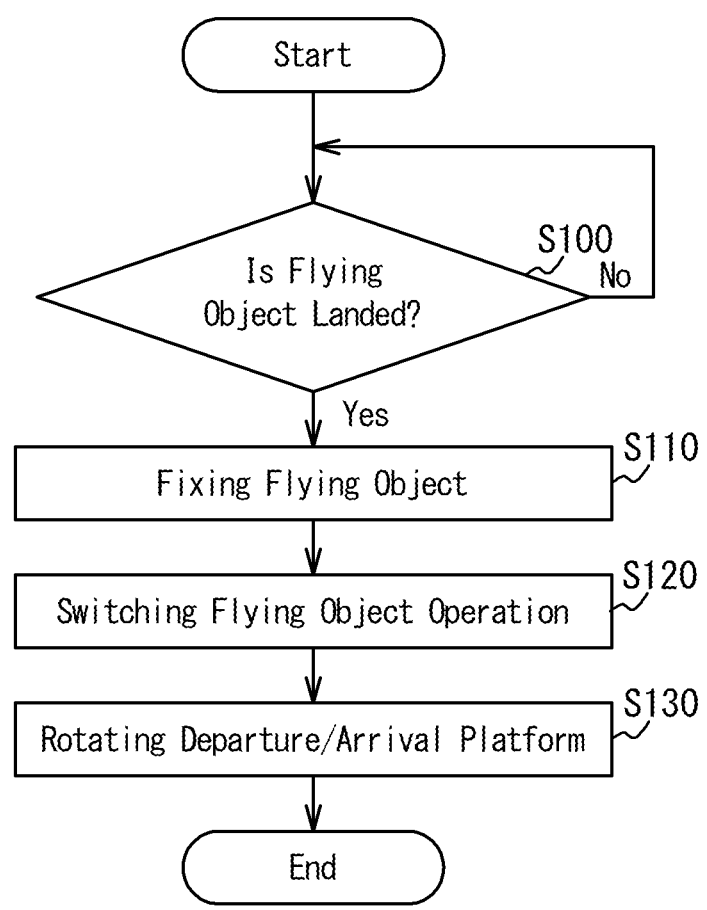
FIG. 10 is a flowchart related to a process of a flying object according to an embodiment when landing on the master unit.

A process when the flying object 20 lands on the master unit 10 will be described. The flying object 20 acquires the position of the master unit 10 and moves to the departure/arrival platform 100 of the master unit 10. As shown in FIG. 10, the master unit processor 141 determines whether the flying object 20 is landed on the departure/arrival platform 100 (step S100). A landing sensor 104 that detects that the flying object 20 exists at a position where the fixing device 101 can fix is arranged on the departure/arrival platform 100. The landing sensor 104 outputs a landing signal to the master unit processor 141 when detecting the flying object 20. When receiving the landing signal, the master unit processor 141 determines that the flying object 20 has landed on the departure/arrival platform 100. If the flying object 20 is landed, the process moves to step S110. If the flying object 20 is not landed on the departure/arrival platform 100, the master unit processor 141 repeats step S100 and waits for the flying object 20 to land on.

In step S110, the master unit processor 141 outputs a fixing signal that indicates the fixing device 101 to fix the flying object 20. When receiving the fixing signal, the fixing device 101 fixes the flying object 20. When fixing the flying object 20, the fixing device 101 outputs a signal that indicates that the flying object 20 is fixed to the master unit processor 141. When receiving the signal from the fixing device 101, the master unit processor 141 transmits a signal, that indicates that the flying object 20 is fixed, to the flying object 20 via the master unit communication device 144. The processor 251 of the flying object 20 receives this signal via the communication device 254.

In step S120, when the flying object 20 is fixed, the processor 251 switches the first switch 223 and the second switch 224 of the power amplifier 220. As a result, the rotating electric machine 215 is connected to the power storage device 230 via the charging circuit 221. In addition, the processor 251 switches so that the rotating electric machine 215 operates as an electric power generator. For this reason, the electric power that the rotor blade 200 has generated at the rotating electric machine 215 by receiving a wind power is stored in the power storage device 230 via the charging circuit 221.

Just after the flying object 20 took off, the rotation axis direction of the rotor blade 200 may be different from the direction in that the rotor blade 200 receiving a wind efficiently rotates. For example, the rotation axis direction of the rotor blade 200 may be in the $z_3$ direction, that is, in the vertical direction. In this case, the rotation axis direction of the rotor blade 200 may be perpendicular to the wind direction. For this reason, in step S130, the master unit processor 141 generates a platform rotation signal that indicates to rotate the departure/arrival platform 100 and transmits it to the master unit power amplifier 114. When receiving the platform rotation signal, the master unit power amplifier 114 starts the electric motor 113 and rotates the departure/arrival platform 100. The master unit power amplifier 114 rotates the departure/arrival surface 100a of the departure/arrival platform 100 until the rotation axis direction of the rotor blade 200 faces the direction in that the rotor blade 200 efficiently rotates by receiving the wind. For example, the master unit power amplifier 114 stops the electric motor 113 when the departure/arrival platform 100 is rotated until the normal direction of the departure/arrival surface 100a of the departure/arrival platform 100 is in a horizontal direction. As a result, the axis of the rotor blade 200 faces a horizontal direction. As the axis of the rotor blade 200 becomes parallel to the wind direction, a power of rotating the rotor blade 200 by wind power is increased. Furthermore, the swing device 122 of the master unit 10 turns the platform rotation axis 111 so that the flying object 20 can efficiently convert wind power to electric power. For example, the swing device 122 rotates the master unit head part 130 so that the axis direction of the platform rotation axis 111 is perpendicular to the wind direction. As a result, the master unit 10 can make the rotation axis direction of the rotor blade 200 parallel to the wind direction.

(Process when the Flying Object Takes Off)

Figure 11:
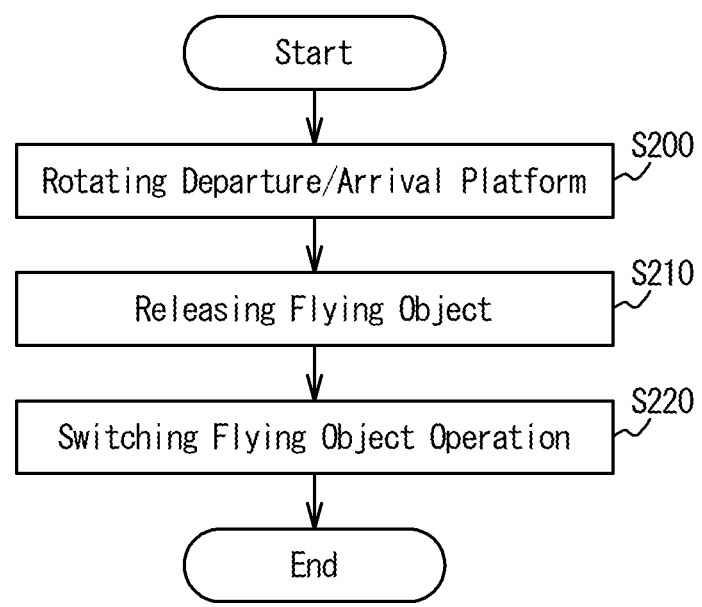
FIG. 11 is a flowchart related to a process of a flying object according to an embodiment when taking off from the master unit.

A process when the flying object 20 takes off from the master unit 10 will be described. When landed on the master unit 10, the flying object 20 operates as an electric power generation device. For this reason, the rotation axis direction of the rotor blade 200 may be different from a direction enabling taking off. For example, the rotation axis direction of the rotor blade 200 faces a horizontal direction. Therefore, the rotation axis direction of the rotor blade 200 needs to be changed, in a vertical direction for example, so that the flying object 20 can take off. As shown in FIG. 11, in step S200, the master unit processor 141 generates a platform rotation signal that indicates to rotate the departure/arrival platform 100 and transmits it to the master unit power amplifier 114. The master unit power amplifier 114 rotates the departure/arrival platform 100 until the rotation axis direction of the rotor blade 200 faces a direction enabling taking off. For example, the master unit power amplifier 114 rotates the departure/arrival platform 100 so that the normal direction of the departure/arrival surface 100a becomes in the vertical upward direction. As a result, as the axis direction of the rotor blade 200 becomes in the vertical direction, the flying object 20 becomes able to take off.

Next, in step S210, the master unit processor 141 generates a release signal for releasing the fixing of the flying object 20 and transmits it to the fixing device 101. The fixing device 101 releases the fixing of the flying object 20 based on the release signal. When the release of the fixing is complete, the fixing device 101 transmits a signal indicating this effect to the master unit processor 141. When receiving the signal from the fixing device 101, the master unit processor 141 transmits a signal indicating that the fixing of the flying object 20 is released to the flying object 20 via the master unit communication device 144. The processor 251 of the flying object 20 receives this signal via the communication device 254.

When the fixing of the flying object 20 is released, in step S220, the processor 251 switches the first switch 223 and the second switch 224 of the power amplifier 220. As a result, the rotating electric machine 215 is connected to the power storage device 230 via the inverter 222. In addition, the processor 251 switches so that the rotating electric machine 215 operates as an electric motor. Afterwards, the processor 251 transmits a rotation signal to the inverter 222 and controls the rotating electric machine 215. As a result, the rotor blade 200 rotates and the flying object 20 takes off.

When the flying object 20 takes off, the processor 251 reads out the flight program from the flight storage device 259 and reads out the program 270 from the storage device 261 of the cartridge 260. Afterwards, the processor 251 controls the rotating electric machine 215, the meteorological sensor 262 and the oceanographic sensor 263 that are mounted to the cartridge 260 and the like, in accordance with the flight program and the program 270 in accordance with the role of the own device.

As described above, the flying object 20 can operate as an electric power generating device by landing on the master unit 10.

Figure 12:
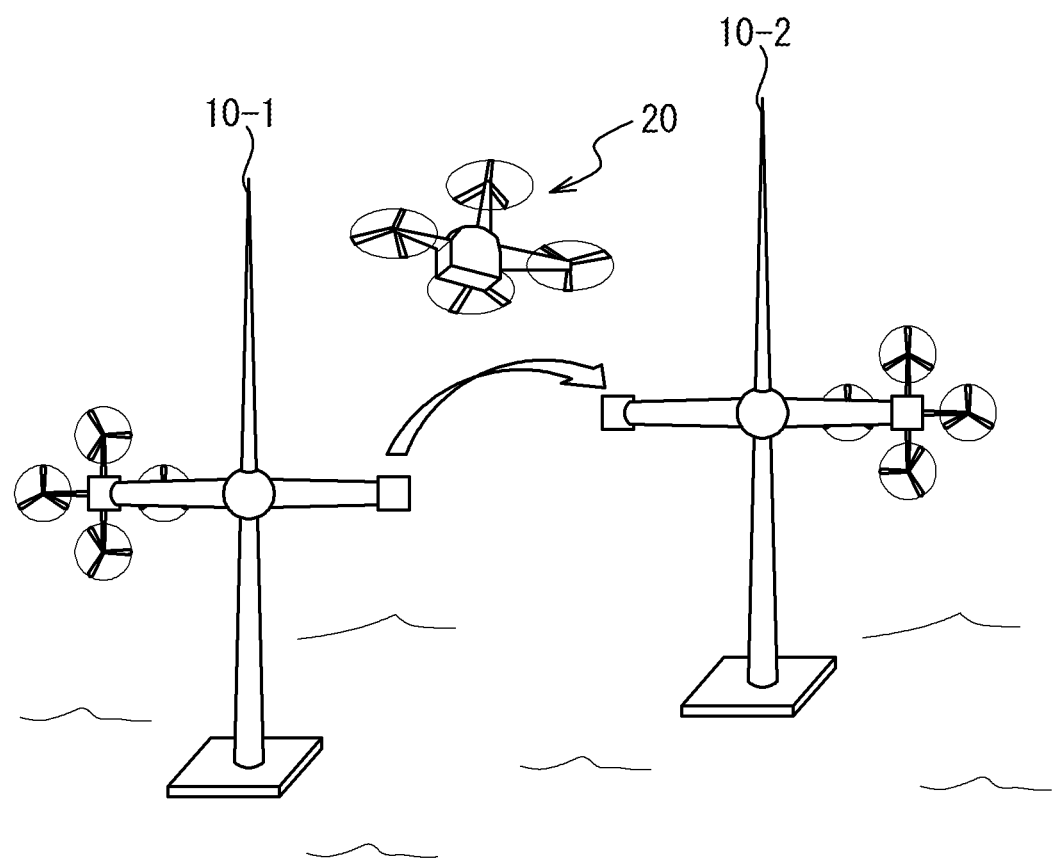
FIG. 12 is a diagram to describe that a flying object according to an embodiment moves between master units.

In addition, as shown in FIG. 12, the flying object system 1 may be provided with a plurality of master units 10 such as a first master unit 10-1 and a second master unit 10-2. In this case, the flying object 20 parked at the first master unit 10-1 may land on another second master unit 10-2.

Figure 13:
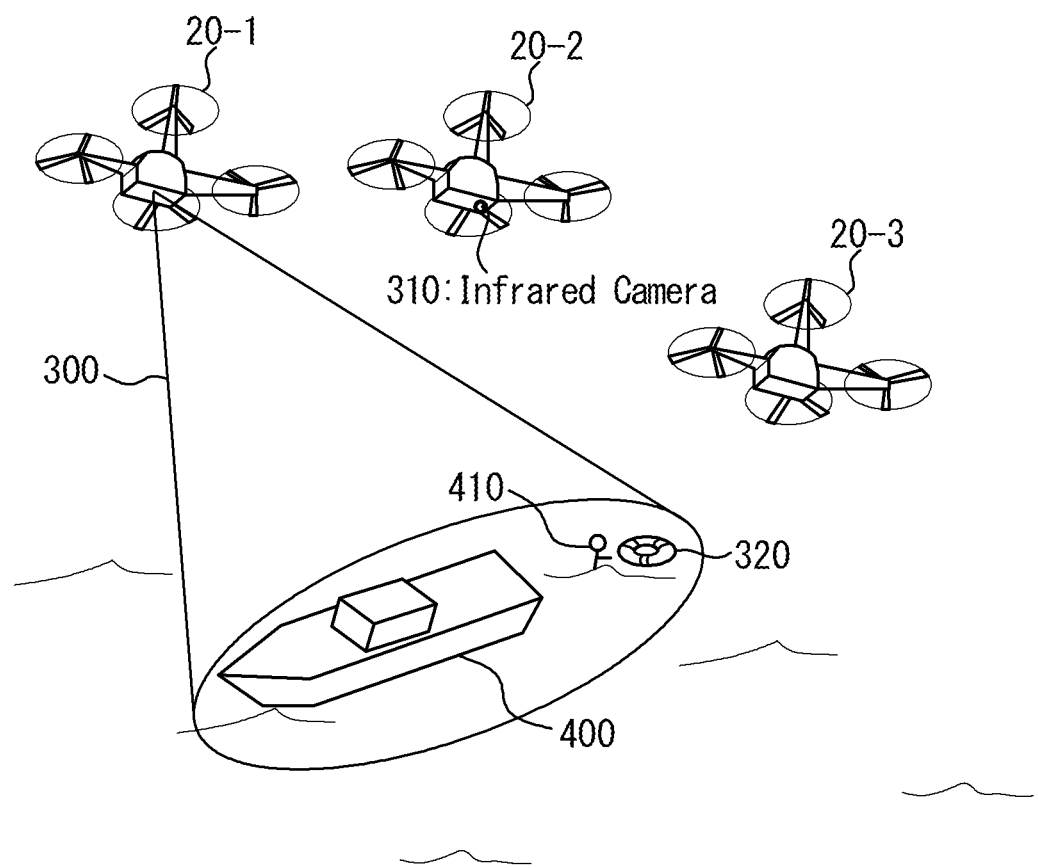
FIG. 13 is a diagram to describe that flying objects according to an embodiment operate in cooperation with each other.

In addition, a plurality of flying objects 20 may cooperate with each other. For example, as shown in FIG. 13, a first flying object 20-1, a second flying object 20-2 and a third flying object 20-3 cooperate with each other to provide a rescue support for a marine accident. A second cartridge 260-2 of the first flying object 20-1 is provided with a searchlight that illuminates light 300. A second cartridge 260-2 of the second flying object 20-2 is provided with an infrared camera 310 that detects a shipwreck 400 or the like. A second cartridge 260-2 of the third flying object 20-3 is provided with a floating ring 320 for providing a rescue support to a rescuer required 410. The second flying object 20-2 uses the infrared camera 310 and the like to detect the shipwreck 400, the rescuer required 410 and the like. When detecting the shipwreck 400, the rescuer required 410 or the like, the second flying object 20-2 transmits position information that indicates the position thereof to the first flying object 20-1 and the third flying object 20-3. The first flying object 20-1 illuminates light 300 based on the position information received from the second flying object 20-2. In addition, the third flying object 20-3 drops the floating ring 320 based on the position information of the rescuer required 410. In addition, the second flying object 20-2 may transmit movie information taken by the infrared camera 310 to the external device 2. The first flying object 20-1, the second flying object 20-2 and the third flying object 20-3 may be controlled as a group.

In addition, the communication device 254 and the master unit communication device 144 may be provided with a plurality of communication means such as a connector for a wired communication, in addition to the communication antenna 253 and the master unit communication antenna 143. For example, when the flying object 20 is landed on the master unit 10, the communication device 254 and the master unit communication device 144 may be wiredly connected. In addition, when the flying object 20 is landed on the master unit 10, transmission and reception of information between the communication device 254 and the master unit communication device 144 may be performed by a wireless communication means for a short distance. In this case, when the fixing device 101 fixes the flying object 20, the master unit 10 may transmit a signal indicating this effect to the flying object 20 by use of wired communication or wireless communication for a short distance. In addition, the master unit 10 may transmit a signal indicating that the fixing device 101 releases the fixing of the flying object 20 to the flying object 20 by use of wired communication or wireless communication for a short distance.

(Variations)

Although the above embodiment shows an example in that the flying object 20 lands from above so that the rotation axis direction of the rotor blade 200 is in the normal direction of the departure/arrival surface 100a, this is not limitative. The master unit 10 only needs to rotate the departure/arrival surface 100a so as to be in a direction in which the flying object 20 can take off, and an angle between a rotation axis direction of the rotor blade 200 and a normal direction of the departure/arrival surface 100a can be arbitrarily selected. In other words, the master unit 10 only needs to rotate the rotation axis direction of the rotor blade 200 to a direction in which the flying object 20 can take off. For example, the departure/arrival surface 100a may be arranged below the departure/arrival platform 100. In this case, the flying object 20 approaches the departure/arrival surface 100a from below and is fixed by the fixing device 101. In addition, shapes of the departure/arrival platform 100 and the departure/arrival surface 100a can be arbitrarily selected as well.

In addition, although in the above embodiment an example of the master unit 10 controlling the rotation axis direction of the rotor blade 200 in a horizontal direction by use of the rotating device 110 is shown, this is not limitative. The master unit 10 only needs to control the rotation axis direction in a direction in which the rotor blade 200 efficiently rotates by wind power and an arbitrary angle can be selected.

In addition, the platform rotation axis 111 and the swing device 122, that are mechanisms for adjusting rotation axis direction of the rotor blade 200, can be arbitrarily selected as well. For example, the platform rotation axis 111 may be connected to a bottom surface of the departure/arrival platform 100.

Although in the above embodiment an example of the master unit 10 transmitting to the flying object 20 the signal indicating that the flying object 20 is fixed is shown, this is not limitative. The flying object 20 only need to check that the flying object 20 is fixed to the master unit 10 and an arbitrary method may be selected. For example, the flying object 20 may be provided with a sensor that detects that the flying object 20 is fixed. In this case, when this sensor detects that the flying object 20 is fixed, the flying object 20 switches the first switch 223 and the second switch 224 of the power amplifier 220.

Although the above embodiment shows an example of transmitting the electric power generated by the rotating electric machine 215 to the master unit power storage device 121 via the power storage device 230, this is not limitative. The electric power generated by the rotating electric machine 215 may be transmitted directly to the master unit power storage device 121.

Although the above embodiment shows an example of arranging the master unit 10 in the sea 3, it can be arranged on a land.

Although the above embodiment shows an example in that the master unit leg part 120 is provided with a propulsion device, this is not limitative. When the master unit 10 does not need to move autonomously, the propulsion device can be omitted from the master unit leg part 120. For example, the master unit 10 may be towed by another ship, a vehicle or the like. In addition, the master unit 10 may be fixed to a land, a seabed or the like.

Figure 14:
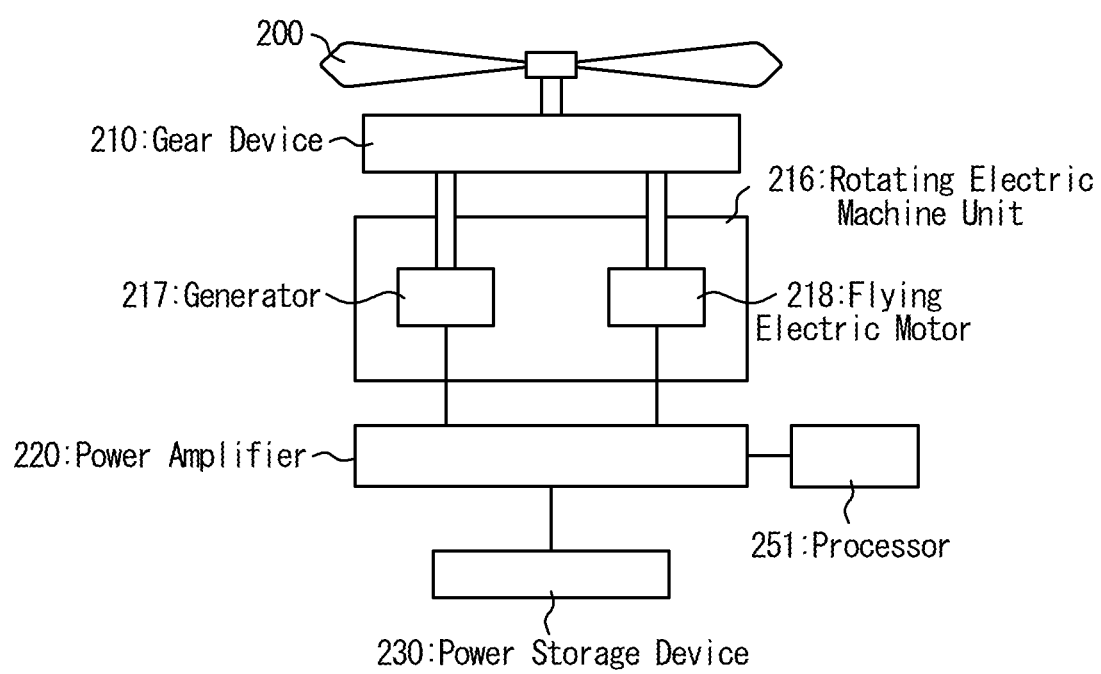
FIG. 14 is a diagram to describe a variation example of a rotating electrical machine unit according to an embodiment.

Although the above embodiment shows an example of the rotating electric machine unit 216 provided with a single rotating electric machine 215, this is not limitative. As shown in FIG. 14, the rotating electric machine unit 216 may be provided with a generator 217 and a flying electric motor 218, separately. In this case, the gear device 210 transmits a power of the rotor blade 200 rotating by receiving wind power to the generator 217 when the flying object 20 is landed on the master unit 10. In addition, the gear device 210 transmits the rotation power generated by the flying electric motor 218 to the rotor blade 200 when the flying object 20 is flying.

It is obvious that the present invention is not limited to each of above embodiments and each embodiment can be modified or changed appropriately within a scope of technical idea of the present invention. As long as no technical contradiction occurs, technologies in each embodiment can be used in another embodiment. The process described above is an example, and an order and a process content of each step may be changed within a scope of not inhibiting functions. In addition, the described configuration may be arbitrarily changed within a scope of not inhibiting functions. For example, shapes of the departure/arrival platform 100 and rotating device 110 or the like may be arbitrarily changed. In addition, an order of the steps S210 and S220 of the flying object 20 taking off from the master unit 10 may be changed. In this case, the master unit 10 may release the fixing when a lift of the flying object 20 exceeds a predetermined value. In addition, the electric power generated by the rotating electric machine 215 may be supplied to an external device directly or via the power storage device 230. In addition, the expansion unit 266 of the cartridge 260 and the master unit expansion unit 166 of the master unit cartridge 160 may be provided with only necessary devices among various sensors, light, communication device and the like.

The invention claimed is:

1. A flying object system comprising:
   a flying object; and
   a master unit configured to be detachably connectable with the flying object,
   wherein the flying object comprises:
      a rotor blade configured to generate lift or thrust by rotating; and
      a rotating electrical machine unit configured to rotate the rotor blade,
   wherein the rotor blade is configured to receive wind power and rotate when not flying,
   wherein the rotating electrical machine unit is configured to generate electric power based on a power that rotates the rotor blade when not flying,
   wherein the master unit comprises a departure/arrival device configured to rotate the flying object around an axis in a horizontal direction,
   wherein the departure/arrival device comprises a departure/arrival platform configured to fix the flying body, and a rotating device whose one end is rotatably connected to the departure/arrival platform,
   wherein the master unit comprises a swing device configured to rotate in a circumferential direction around a vertical axis passing through a center of the master unit, and is configured to rotate so that the longitudinal direction of the departure/arrival device is perpendicular to the wind direction, and wherein the departure/arrival device is configured to:
allow, when the rotating electrical machine unit generates electric power, the rotating device to rotate the departure/arrival platform around an axis in a longitudinal direction of the departure/arrival device, and make a rotation axis direction of the rotor blade rotate in a direction in which the rotor blade receives the wind power and rotate; and
make, when the flying object takes off, the rotation axis direction rotate in a direction in that the flying object takes off.

2. The flying object system according to claim 1,
wherein the master unit comprises a master unit power storage device configured to store electric power generated by the rotating electrical machine unit.

3. The flying object system according to claim 1,
wherein the flying object comprises a detachably connected cartridge configured to have a desired function, and
wherein the master unit comprises a cartridge replacing device configured to replace the cartridge.

4. The flying object according to claim 3, further comprising a processor,
wherein the cartridge comprises a storage device configured to store a program, and
wherein the processor is configured to execute the program stored in the storage device.

5. The flying object according to claim 3, wherein the cartridge comprises a sensor configured to measure meteorologic information or oceanographic information.

6. The flying object according to claim 3, wherein the cartridge comprises a sonic sensor.

7. The flying object according to claim 1, further comprising a power storage device configured to store electric power generated by the rotating electrical machine unit.

8. The flying object according to claim 1,
wherein the rotating electrical machine unit comprises a rotating electrical machine, and
wherein the rotating electrical machine is configured to:
rotate the rotor blade; and
generate electric power based on the power that rotates the rotor blade.

9. The flying object according to claim 1,
wherein the rotating electrical machine unit comprises:
an electric motor configured to rotate the rotor blade; and
a generator, that is different from the electric motor, configured to generate electric power based on the power that rotates the rotor blade.

* * * * *